3,070,599
METHOD FOR PREPARING SECONDARY AMINO-BENZOTHIAZOLEDISULFIDES
Charles Malcolm Hendry and Earl C. Gregg, Jr., Cuyahoga Falls, Ohio, assignors to The B.F. Goodrich Company, New York, N.Y., a corporation of New York
No Drawing. Filed Aug. 28, 1958, Ser. No. 757,672
8 Claims. (Cl. 260—247.1)

This invention relates to a new method for preparing secondary aminoazoledisulfides and more particularly pertains to the single step process for preparing substantially pure secondary aminoazoledisulfides in high yield by the reaction of a bisazoledisulfide with a secondary amine and a sulfur monohalide.

Previously disclosed methods for the preparation of compounds of the aminoazoledisulfide type have involved several steps and have given relatively impure products. The secondary aminoazoledisulfides of the present invention are useful in promoting the cure of rubber and they are particularly useful as delayed action and non-scorching accelerators. Because the efficiency of the secondary aminoazoledisulfides as rubber accelerators is largely dependent upon their purity, the relative simplicity and economy of the process of the present invention as well as the higher purity of product makes it all the more important commercially.

The compounds which are embodied in this invention are the secondary aminoazoledisulfides which conform to the general formula $$\underset{R'}{\overset{R}{\diagdown}} N-S-S-R''$$

wherein R and R' are the same or different aliphatic, alicyclic, or aralkyl groups or R and R' together form a single chain and R'' represents a member of the group consisting of thiazoles, imidazoles and oxazoles.

The secondary aminoazoledisulfides are prepared in accordance with the process of this invention by the reaction of a bis-azoledisulfide with a secondary amine and a sulfur monohalide. Because hydrogen halide is generated during the reaction, an acid acceptor is generally used.

We have found that an excess of the secondary amine reactant will serve as the hydrogen halide acceptor as illustrated in the following reaction representative of the process of this invention wherein bis-2-benzothiazyl disulfide, morpholine and sulfur monochloride are allowed to react.

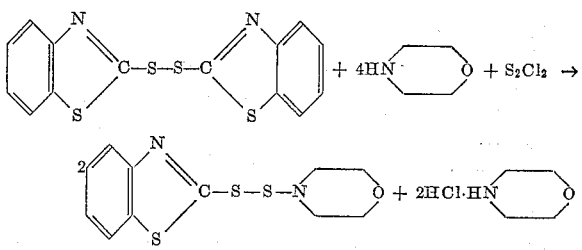

At least a two mole excess of morpholine is used to tie up the hydrogen chloride formed during the course of the reaction. We have also found that an inorganic base such as an alkali metal oxide, hydroxide or carbonate; an alkaline earth metal oxide, hydroxide or carbonate; or aliphatic, alicyclic and heterocyclic tertiary amines can be used in place of an excess of the amine reactant as the hydrogen halide acceptor as illustrated in the following scheme wherein one mole of bis-benzothiazyl disulfide, at least two moles of morpholine, one mole of sulfur monochloride and two moles of sodium hydroxide are used.

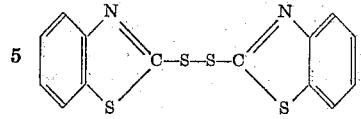

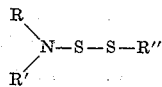 + $S_2Cl_2$ + 2NaOH $\longrightarrow$

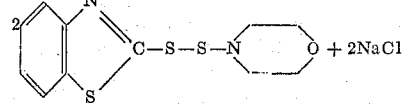 + 2NaCl

The bis-azoledisulfides conforming to the structure R''—S—S—R'' wherein R'' has the aforementioned designation which are useful in the present invention include the bis-thiazoledisulfides such as bis-2-thiazyldisulfide, bis-4-methyl-2-thiazyldisulfide, bis-4-ethyl-2-thiazyldisulfide, bis-4-n-propyl - 2 - thiazyldisulfide, bis-4-n-butyl-2-thiazyldisulfide, bis-4,5-dimethyl - 2 - thiazyldisulfide, bis-4,5-diethyl-2-thiazyldisulfide, bis-4,5-di-n-propyl-2-thiazyldisulfide, bis-4,5-di-n-butyl-2-thiazyldisulfide, bis-4-phenyl-2-thiazyldisulfide, bis-4-phenyl - 5 - methyl-2-thiazyldisulfide, bis-2-benzothiazyldisulfide, nuclear substituted bis-2-benzothiazyldisulfide, and bis-2-tetrahydrobenzothiazyldisulfide; the bis-oxazoledisulfides such as bis-2-oxazyldisulfide, bis-4-methyl-2-oxazyldisulfide, bis-4-ethyl-2-oxazyldisulfide, bis-4-n-propyl-2-oxazyldisulfide, bis-4-n-butyl-2-oxazyldisulfide, bis-4,5-dimethyl-2-oxazyldisulfide, bis-4,5-diethyl-2-oxazyldisulfide, bis-4,5-di-n-propyl-2-oxazyldisulfide, bis-4,5-di-n-butyl-2-oxazyldisulfide, bis-4-phenyl-2-oxazyldisulfide, and bis-4-phenyl-5-methyl-2-oxazyldisulfide; and the bis-imidazyldisulfides such as bis-2-imidazyldisulfide, bis-4-methyl-2-imidazyldisulfide, bis-4-methyl-2-imidazyldisulfide, bis-4-n-propyl - 2 - imidazyldisulfide, bis-4-n-butyl-2-imidazyldisulfide, bis-4,5-dimethyl-2-imidazyldisulfide, bis-4,5-diethyl-2-imidazyldisulfide, bis-4,5-di-n-propyl-2-imidazyldisulfide, and bis-4,5-di-n-butyl-2-imidazyldisulfide. The preferred bis-azoledisulfide is bis-2-benzothiazyldisulfide.

The secondary amines conforming to the structure $$\underset{R'}{\overset{R}{\diagdown}} NH$$

wherein R and R' have the aforementioned designations which are useful in this invention include dialkyl amines such as dimethyl amine, diethyl amine, di-n-propyl amine, di-n-butyl amine, di-iso-butyl amine, di-n-amyl amine, di-iso-amyl amine, di-n-hexyl amine, di-n-heptyl amine, di-cyclohexyl amine, di-n-octyl amine, N-methyl butylamine, N-ethylcyclohexylamine, and di-benzyl amine; and the heterocyclic amines such as morpholine, thiomorpholine, N-methyl piperazine, N-ethyl piperazine, piperidine 5-ethyl-2-methyl piperidine and pyrrolidine. The preferred secondary amines for the purpose of this invention are the heterocyclic amines and the most preferred are morpholine and thiomorpholine.

The sulfur monohalides useful in this invention include sulfur monochloride, sulfur monofluoride, sulfur monobromide and sulfur monoiodide. The preferred sulfur monohalide is sulfur monochloride.

The prefered process of this invention involves two general procedures. In the first procedure the bis-azoledisulfide and secondary amine in a molar ratio of 1 to at least 4 respectively are dissolved in an inert organic diluent and the solution is treated with a molar quantity of the sulfur monohalide at a temperature of from about 25° C. to about 135° C. and more preferably about 40° C. to about 110° C. The completed reaction mixture is a slurry of about two molar quantities of the amine hydrohalide suspended in the solution of secondary aminoazoledisulfide. The secondary amine hydrohalide can be separated by filtration or by extraction with water and the amine may be recovered from its salt by known procedures.

In the second general procedure the bis-azole-disulfide and secondary amine in the mole ratio of 1 to at least 2 respectively are dissolved in an inert organic diluent at a temperature of from about 25° C. to about 135° C. and from 40 to 60% of the single mole quantity of sulfur monohalide is added slowly to the heated solution followed by the continued slow addition simultaneously of the remainder of the sulfur halide and an aqueous solution of an alkaline hydrogen halide acceptor. The reaction product is a two phase system which readily separates to a water layer and an organic layer. The water layer is easily separated leaving the secondary aminoazoledisulfide in the organic solvent. The secondary aminoazoledisulfide is easily separated in high yield and good purity from the organic solution which results from either general procedure by concentration, cooling and filtration.

The inert organic diluents which are useful in the present invention include aromatic hydrocarbons such as benzene, toluene and the xylenes; halogenated aromatic hydrocarbons such as chlorobenzene; nitrated aromatic hydrocarbons such as nitrobenzene; chlorinated aliphatic hydrocarbons such as chloroform; lower aliphatic esters such as ethyl acetate, ethyl propionate, propyl acetate and the like; aliphatic cyclic ethers such as dioxane and tetrahydrofuran; and polar organic solvents such as dimethyl formamide. The preferred organic diluents are toluene, chloroform and chlorobenzene.

Although the procedures described above and in the examples disclose the use of an organic solvent such as benzene, xylene, toluene, dioxane, chloroform, chlorobenzene, bromobenzene, dimethyl formamide, nitrobenzene and the like, it is to be understood that the reaction can be carried out in the absence of a diluent. The use of a diluent is preferred, however, because better temperature control can be maintained during the reaction and greater purity and higher yield of product is obtained.

The following examples are given to illustrate the process of this invention.

*Example I*

A glass reactor equipped with a mechanical stirrer is charged with 87 g. of morpholine (1.0 mole), 83.1 g. of bis-2-benzothiazyldisulfide and 500 ml. of chloroform. The stirred mixture is warmed to about 65° C. and 33.8 g. (0.25 mole) of sulfur monochloride is added slowly to the reaction mixture while a pot temperature of from about 33° to 58° C. is maintained. At the completion of the addition of the sulfur monochloride the reaction mixture is refluxed for an hour and the insoluble morpholine hydrochloride is removed from the hot slurry by rapid filtration. A 120 g. (84.5% yield) sample of 2-benzothiazyl-N-morpholinyl disulfide M.P. 128–131° C. is isolated from the filtrate upon concentration and cooling. When thiomorpholine is used in place or morpholine in the above procedure comparable yields of 2-benzothiazyl-N-thiomorpholinyl disulfide are obtained.

*Example II*

The procedure described in Example I is followed with the exception that chlorobenzene is used as the solvent and the reaction mixture is maintained at a temperature of 85–102° C. during the addition of the sulfur monochloride. By this procedure 117.5 g. of 2-benzothiazyl-N-morpholinyl disulfide or 82.5% of theory is obtained.

*Example III*

A mixture of 333 g. of bis-2-benzothiazyl-disulfide, 348 g. of morpholine and 1250 ml. of toluene is treated slowly at a temperature of from 50 to 85° C. with 135 g. of sulfur monochloride in the manner described in Example I. At the end of the reaction period water is added slowly to the stirred mixture until all of the morpholine hydrochloride is dissolved in the aqueous phase. The organic layer is separated and 508.6 g. of 2-benzothiazyl-N-morpholinyl disulfide representing 89.4% of theory is recovered from the toluene upon concentration and cooling. The white crystalline product melts at 132–135° C.

*Example IV*

A mixture of 17.4 g. of morpholine, 33.3 g. of bis-2-benzothiazyldisulfide, and 250 ml. of chlorobenzene is stirred and heated at 75–93° C. and about 7 g. of sulfur monochloride is added slowly. The stirring is continued and an additional 6.5 g. of sulfur monochloride and a solution of 8 g. of sodium hydroxide in 100 g. of water are added dropwise simultaneously to the reaction mixture which is held at a temperature of from 72 to 93° C. during the addition. After the addition of the alkali and remainder of the sulfur monohalide is completed the reaction mixture is stirred for an additional hour at 85–93° C. The organic layer is separated and concentrated yielding 45.6 g. of 2-benzothiazyl-N-morpholinyl disulfide. When the procedure described above is carried out with the substitution of ethyl acetate for chlorobenzene, comparable results are obtained. The use of potassium hydroxide, potassium carbonate, sodium carbonate and calcium oxide in place of sodium hydroxide to accept the hydrogen chloride give comparable results.

*Example V*

A mixture of 66.6 g. of bis-2-benzothiazyl-disulfide, 38.3 g. of morpholine and 500 ml. of toluene is stirred and heated at 65–71° C. while 13.5 g. of sulfur monochloride is added slowly. An additional 13.5 g. of sulfur monochloride and a solution of 16 g. of sodium hydroxide in 100 g. of water are added simultaneously in a dropwise fashion to the heated and stirred reaction mixture. The organic layer is then separated from the aqueous layer and concentration and cooling of the organic layer yields 93.5 g. of white, crystalline 2-benzothiazyl-N-morpholinyl disulfide. The substitution of piperidine for morpholine in the above procedure gives a comparable yield of 2-benzothiazylpiperidyl disulfide.

It is obvious that many changes and modifications can be made in the above-described details without departing from the nature and spirit of this invention. Therefore, it is to be understood that the invention is not limited to said details except as set forth in the appended claims.

The embodiments of the invention in which an exclusive property or privilege is claimed are defined as follows:

1. The method for preparing secondary aminothiazoledisulfides comprising reacting substantially one molar quantity of bis-2-benzothiazyldisulfide; at least two molar quantities of a heterocyclic amine selected from the group consisting of morpholine, thiomorpholine, N-methylpiperazine, N-ethyl piperazine, piperidine, 5-ethyl-2-methyl piperidine and pyrrolidine; and one molar quantity of sulfur monochloride at a temperature of from about 25° C. to about 135° C. in an inert organic diluent in the presence of substantially two equivalent weight quantities of a basic hydrogen chloride acceptor selected from the class consisting of said heterocyclic amine and an alkali metal hydroxide for each molar quantity of sulfur monochloride.

2. The method of claim 1 wherein the hydrogen halide acceptor is said heterocyclic amine.

3. The method of claim 1 wherein the hydrogen halide acceptor is an alkali metal hydroxide.

4. The method for preparing 2-benzothiazyl-N-morpholinyl disulfide which comprises reacting substantially one mole of bis-2-benzothiazyldisulfide with at least four moles of morpholine and substantially one mole of sulfur monochloride, two moles of said morpholine serving as a hydrogen chloride acceptor, at a temperature of from about 40° C. to about 110° C. in toluene.

5. The method for preparing 2-benzothiazyl-N-morpholinyl disulfide which comprises reacting substantially one mole of bis-2-benzothiazyl-disulfide with at least four moles of morpholine and substantially one mole of sulfur monochloride, two moles of said morpholine serving as a hydrogen chloride acceptor, at a temperature of from about 40° C. to about 110° C. in chloroform.

6. The method for preparing 2-benzothiazyl-N-morpholinyl disulfide which comprises reacting substantially one mole of bis-2-benzothiazyl-disulfide with at least four moles of morpholine and substantially one mole of sulfur monochloride, two moles of said morpholine serving as a hydrogen chloride acceptor, at a temperature of from about 40° C. to about 110° C. in chlorobenzene.

7. The method for preparing benzothiazyl-N-morpholinyl disulfide which comprises reacting substantially one mole of bis-2-benzothiazyl-disulfide in chlorobenzene, at least two moles of morpholine and substantially one-half mole of sulfur monochloride followed by the slow simultaneous addition to the reaction mixture of substantially one-half mole of sulfur monochloride and substantially two moles of sodium hydroxide at a temperature of from about 40° C. to about 110° C.

8. The method for preparing 2-benzothiazyl-N-morpholinyl disulfide which comprises reacting substantially one mole of bis-2-benzothiazyl-disulfide in toluene, substantially two moles of morpholine and substantially one-half mole of sulfur monochloride followed by the slow simultaneous addition to the reaction mixture of substantially one-half mole of sulfur monochloride and substantially two moles of sodium hydroxide at a temperature of from about 40° C. to about 110° C.

References Cited in the file of this patent

UNITED STATES PATENTS

| | | |
|---|---|---|
| 1,661,998 | Carson | Mar. 6, 1928 |
| 2,259,164 | Jones | Oct. 14, 1941 |
| 2,273,321 | Jones | Feb. 17, 1942 |
| 2,343,524 | Blake | Mar. 7, 1944 |
| 2,510,894 | Kleiman | June 6, 1950 |
| 2,609,373 | Beaver | Sept. 2, 1952 |
| 2,730,527 | Kinstler | Jan. 10, 1956 |
| 2,747,005 | Zerbe et al. | May 22, 1956 |
| 2,766,236 | Harman | Oct. 9, 1956 |
| 2,772,278 | Hardman | Nov. 27, 1956 |
| 2,779,761 | Kibler | Jan. 29, 1957 |
| 2,835,670 | Hardman | May 20, 1958 |
| 2,837,519 | Hardman | June 3, 1958 |
| 2,850,496 | Hardman | Sept. 2, 1958 |

FOREIGN PATENTS

| | | |
|---|---|---|
| 711,236 | Great Britain | June 30, 1954 |

OTHER REFERENCES

Michaelis et al: Ber. Deut. Chem. Gesell., vol. 28, pages 165–7 (1895).